INVENTORS S. J. BUCHSBAUM
R. KOMPFNER
BY Wilford L. Wiener
ATTORNEY

United States Patent Office 3,506,834

Patented Apr. 14, 1970

3,506,834

TIME-DIVISION MULTIPLEX OPTICAL TRANSMISSION SYSTEM

Solomon J. Buchsbaum, Westfield, and Rudolf Kompfner, Middletown, N.J., assignors to Bell Telephone Laboratories, Incorporated, Murray Hill, N.J., a corporation of New York Filed Apr. 17, 1967, Ser. No. 631,301
Int. Cl. H04b *9/00*
U.S. Cl. 250—199 3 Claims

ABSTRACT OF THE DISCLOSURE

Optical time-division multiplexing is provided in an optical communication system or other optical transmission system by deflecting a laser beam sequentially and repetitively to a plurality of modulators driven by the signals to be multiplexed and then combining the modulated optical pulses into a single beam in the transmitter by inverse deflection in a sequence that is synchronized with the initial deflection. Demultiplexing at the receiver is obtained by sequentially and repetitively deflecting the received beam to a plurality of detectors and synchronizing the deflection with clock signals or similar signals supplied from the transmitter in one of the transmission channels. High-speed electro-optic deflection with a circular, conical scan is employed for each deflection operation; and deflection angles suitable for a high capacity system are obtained by employing confocal mirror structures providing multiple-pass operation in the deflectors.

CROSS-REFERENCES TO RELATED APPLICATIONS

This application is filed concurrently with the applications of Messrs. R. Kompfner and E. A. Ohm, respectively, Ser. Nos. 631,394 and 631,505, both assigned to the assignee hereof.

BACKGROUND OF THE INVENTION

This invention relates to optical transmission systems in which multiplexing of signals is employed. Signals are said to be multiplexed when they are combined for transmission in a common path.

Multiplexing techniques are usually classified into the two broad categories of frequency-division multiplexing, in which the separate communication channels have different carrier frequencies, and time-division multiplexing, in which the separate communication channels occupy different time slots in a repetitive cycle called a multiplexing cycle.

Schemes for optical frequency-division multiplexing have been proposed; and time-division multiplexing has also been suggested. In one such suggestion, the multiplexing and demultiplexing of the modulating signals is done at baseband when they lack an optical carrier. In another such proposal, the multiplexing is done by interleaving modulated pulses from pulsed lasers. The width of such pulses in time is characteristic of the lasers and limits the information-carrying capacity of such systems.

SUMMARY OF THE INVENTION

We have recognized that a system of greater information capacity may be built by time-division multiplexing of modulated light beams with controllable deflection techniques. The light beams to be multiplexed may originate from one continuous-wave laser beam. Indeed, such optical time-division multiplexing may be the most practical way to obtain transmission systems with bit rates as high as $10^{12}$ bits per second.

In addition, optical time-division multiplexing by light beam deflection should be highly compatible with the use of pulse code modulation (PCM) in transmitting signals. It is now believed that PCM may be the most practical method of modulation of lasers for communication, since, with this method of modulation, the cumulative effects of noise produced in the laser repeaters can be readily overcome. Consequently, high-capacity optical time-division multiplexing should speed commercial development of communication by laser beams.

According to our invention, optical time-division multiplexing is obtained by supplying beams, derived from a single optical beam by a controllable deflection technique, in a plurality of paths having respective optically resolvable positions for modulation, modulating the beams with a like plurality of signals in the respective resolvable positions, and combining the beams by deflecting them while still in the transmitter to propagate along a single path in time-division sequence. As used in this application, deflection is a controllable scanning effect exerted directly upon a light beam.

Specifically, light beams are supplied in the plurality of paths by deflection apparatus adapted to deflect a light beam from a single source into the different paths in a repetitive sequence. The source typically supplies a continuous beam of light. This deflection is basically a method for supplying repetitive light pulses to $n$ modulators sequentially, each of the modulators being in one of the different paths. Each beam in each path is then modulated in the corresponding modulator by an applied modulating signal. The beams are combined, that is, multiplexed, by a light deflection apparatus adapted to scan repetitively around a closed path intersecting all of the plurality of paths. This multiplexing deflector is driven in the same manner as the previously described deflector; and it produces the inverse or reciprocal effect, which is combination of the modulated beams in a single path. The multiplexing deflector has a sufficiently large input aperture to receive all of the modulated beams. The two deflectors are synchronized so that they scan repetitively in essentially identical fashion or, alternatively, may be combined in one deflection system by the use of a reflective arrangement including an optical circulator. Each repetition is a multiplexing cycle. In order that the operation of the deflectors be relatively efficient, the scanned path is made compact, typically by spacing the plurality of optically resolvable positions uniformly about a circle. The input apertures of the modulators determine these positions. The efficiency of the multiplexing deflector is further increased by converging the beams toward its input aperture in a cone-shaped bundle.

As another specific feature of our invention, demultiplexing is obtained at the receiver by deflecting the multiplexed received beam to a second plurality of optically resolvable positions for detection, and detecting the respective modulations in those positions. The demultiplexing deflection at the receiver is synchronized with the multiplexing deflection at the transmitter, typically by using one channel of the system for transmission of clock pulses, or similar signals adapted for this purpose.

Further features of our invention involve its adaptation for regenerative repeaters, for a heterodyne mode of operation, and for a reflective mode of operation.

DESCRIPTION OF ILLUSTRATIVE EMBODIMENTS

Figure 1:
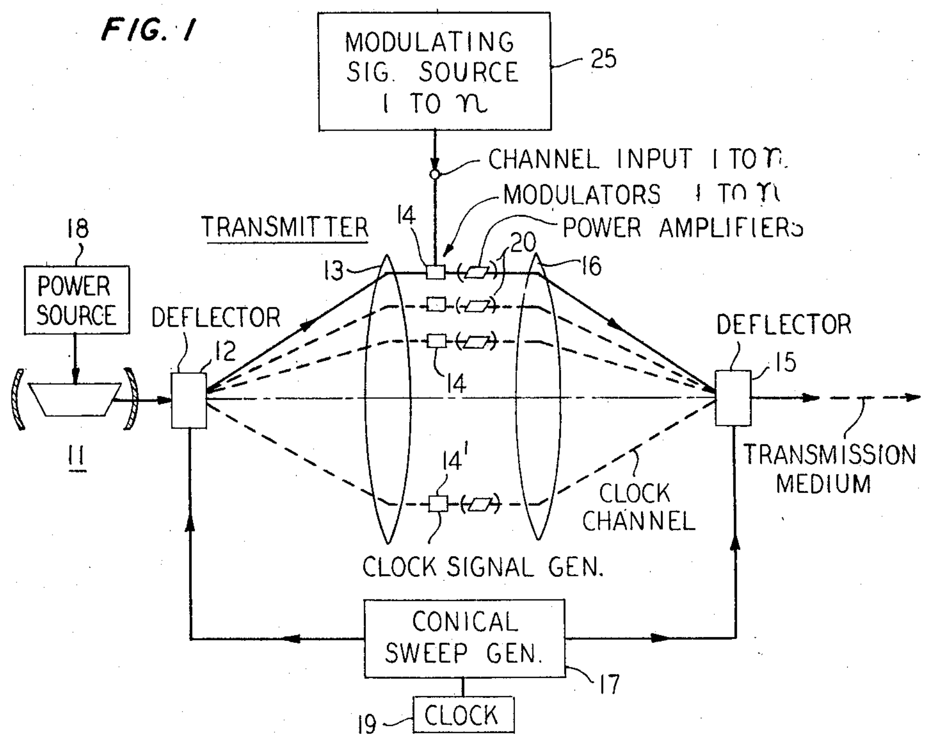
FIG. 1 is a partially pictorial and partially block diagrammatic illustration of a preferred embodiment of a transmitter employing our invention.
Figure 2:
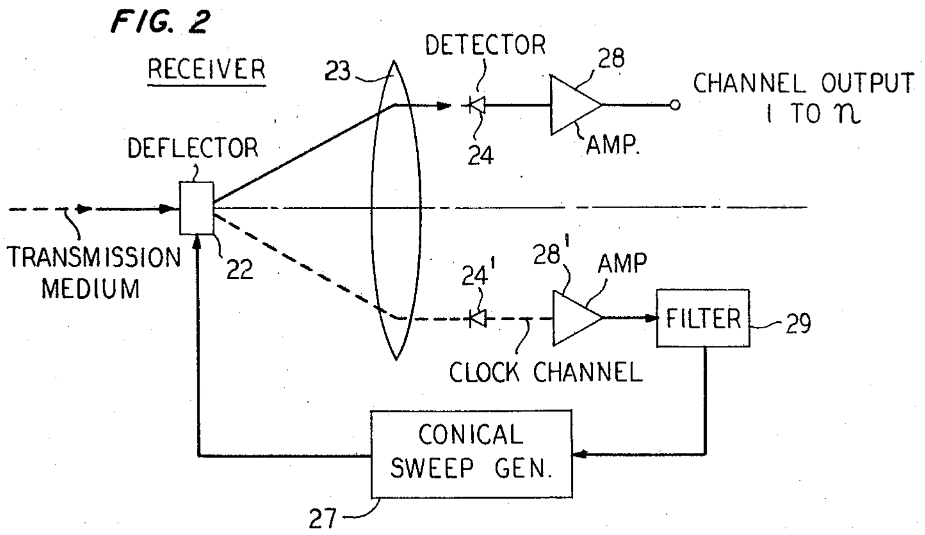
FIG. 2 is a partially pictorial and partially block diagrammatic illustration of a preferred embodiment of a receiver employing a feature of our invention.

The purpose of the illustrative embodiment shown in FIGS. 1 and 2 is to transmit optical signals by time-division multiplexing a plurality, $n$, of signal channels, each of frequency bandwith, $b$, on a single beam of light to obtain a total system capacity of $$B=nb \quad (1)$$

cycles per second. It can be shown that such a system has a total information capacity for pulse code or other digital modulation of $nb$ bits per second. The signals are to be transmitted from the transmitter shown in FIG. 1 through a transmission medium and possibly repeaters, such as that of FIG. 8, to the receiver shown in FIG. 2.

A feasible system at the present state of the technology, by a conservative estimate, could have $b=1{,}000$ megacycles per second and $n=100$ to yield a total capacity $B=10^{11}$ bits per second. Moderate increases of both $b$ and $n$ could yield a total capacity of $10^{12}$ bits per second, or even more.

The transmitter of FIG. 1 is based upon the concept that the desired number $n$ of resolvable beam positions for the purpose of separate modulation with $n$ separate signals can most efficiently be achieved by a circular conical scan of the coherent light beam derived from a laser 11. The conical deflection of the output beam from the laser 11 is provided by the deflector 12, which will be described hereinafter with reference to FIGS. 4 through 6.

A recollimating lens 13 is centered upon the axis of the deflection cone with its focus at the apparent deflection point of deflector 12 in order to direct the deflected beam parallel to the axis of the deflection cone. All possible positions of the beam are thus rendered parallel. The deflected beam is divided into $n$ beams in $n$ resolvable paths by the input apertures of modulators 14, which are designated one to $n$ in correspondence to a similar channel designation of the $n$ input signals. A different input signal, which is the discrete communication signal to be transmitted, is applied to each modulator, although only a single connection for this purpose is illustrated in order to simplify the drawing. The modulated light beam can then be amplified in laser power amplifiers 20. They are directed back toward the deflection point of a second deflector 15, which is like deflector 12, by a converging lens 16 which is centered upon the axis of a deflection cone of deflector 15 and has its focus at the apparent deflection point of deflector 15. Deflector 15 and lens 16 provide the inverse function of deflector 12 and lens 13; lens 16 may be identical to lens 13. Thus, deflector 15 receives light beams which are appearing on a conical spatial surface in a circular scanning sequence and directs them along a common path as a single beam through the transmission medium. The $n$ modulated beams are properly multiplexed if they are redirected along the common transmission path so that they fall into sequential time-wise portions of the output beam without overlap. In other words, they should propagate in a common path in a time-division sequence. To achieve this, the deflectors 12 and 15 are coordinated by conical sweep generator 17 so that their functions are precisley inverse.

To understand this principle, consider the following explanation. The circular scan of deflector 12 may, in general, be produced by sinusoidal linear deflections in orthogonal coordinates in response to equal-amplitude deflecting signals that are 90° out of phase. The same is true of deflector 15. In order for deflector 15 to provide the inverse function of deflector 12, it actually bends the beams through the same angle, in the same plane and in the same sense, i.e., clockwise or counter-clockwise, as the deflector 12. Consideration of the relationship of the bends of the light beams as viewed normal to the plane of each pair of deflections, will show this to be true. The signals in channels one through $n$ are thus effectively time-division multiplexed for transmission through the transmission medium.

It will be noted that one of the $n$ signal channels may be used to transmit information that will synchronize the receiver of FIG. 2 with the transmitter of FIG. 1 so that the various channels can be separated consistently and properly identified, although a separate transmission line could be used. This channel will carry a characteristic signal, or clock signal, which is illustratively modulated upon one of the resolvable beams between lenses 13 and 16 by a clock signal generator 14' as shown in FIG. 1.

A more detailed description of the specific nature of the components of FIG. 1 will be deferred until after the organization and operation of the receiver of FIG. 2 has been described, since the receiver uses many of the same kind of components as the transmitter of FIG. 1.

In FIG. 2 the beam received from the transmitter of FIG. 1 through the transmission medium is applied to the deflector 22 which is like deflector 12 of FIG. 1 and produces a conical scan of the light beam which is synchronized as described hereinafter so that each separate one of the multiplexed signals is consistently applied to the same detector of the receiver. A lens 23, like lens 13 of FIG. 1, is centered on the axis of the deflection cone to have its focus at the apparent deflection point of deflector 22. It focuses the various resolvable deflected beams to facilitate detection in the detectors 24, illustratively diodes of which there are $n$, corresponding to the $n$ modulators of FIG. 1. It should be noted that lens 23 is entirely optional and can be eliminated. Also, separate focusing for each beam could be provided. The diode which receives the clock signal is labeled 24' although it could be any one of the diodes 24. Having been initially received at the diode 24', the clock signal is applied to the clock channel amplifier 28' and then to the filter 29 which removes low-level noise. The detected clock signal then is applied to the conical sweep generator 27 which is like generator 17 of FIG. 1. The sinusoidal equal-amplitude X and Y deflection signals of generator 27 have the same frequency $f_m$ as the signals of sweep generator 17 of FIG. 1. These signals are 90° out of phase and are applied to the deflector 22 to drive the conical scan of the light beam. The X and Y deflection signals are synchronized by the clock signals so that the clock signals continue to be applied consistently to diode 24'. The clock signals are baseband electrical signals when applied to the circular sweep generator 27 and achieve synchronization in the same manner as the synchronization circuits in any cathode ray tube deflection circuit.

The other $(n-1)$ information signals are respectively continuously applied to the same diodes 24 and are amplified by the corresponding amplifiers 28 and applied to separate channel outputs, $(n-1)$ in number. These output signals are then utilized for their intended purpose.

The operation of the system of FIGS. 1 and 2 with pulse code modulation will now be described. The deflection of the light beam past the input apertures of the modulators generates within each modulator pulses at a rate equal to the multiplexing frequency, $f_m$. The light beam pulse passing through each modulator 14 samples the signal of that channel at a rate $f_m$; in fact, the signals are either of bandwidth $b$ substantially equal to $f_m$ or in the form of pulse code modulation with a bit rate of $f_m$ as supplied from their respective sources 25.

It may be preferred that each input signal be sampled at or near the instant of maximum amplitude (or maximum phase shift if we use differential phase pulse code modulation). Provision of the appropriate synchronization between generator 17 and the modulating signal sources at the frequency $f_m$ (e.g., 1,000 megacycles per second) would be straightforward, but is not shown. Each modulator 14 must have an effective bandwidth $b$ of the order of $f_m$ if it is to transfer the signal faithfully to the light beam.

The light beam now carries all the signal channels in the form of a sequence of pulses of length $\tau$, where $$\tau \sim \frac{1}{2}\frac{1}{nf_m}=\frac{1}{2}\frac{1}{nb} \qquad (2)$$

the factor ½ has been chosen and employed in Equation 2 to provide for separation between successive pulses needed to avoid crosstalk or interference between neighboring signal channels.

Figure 3:
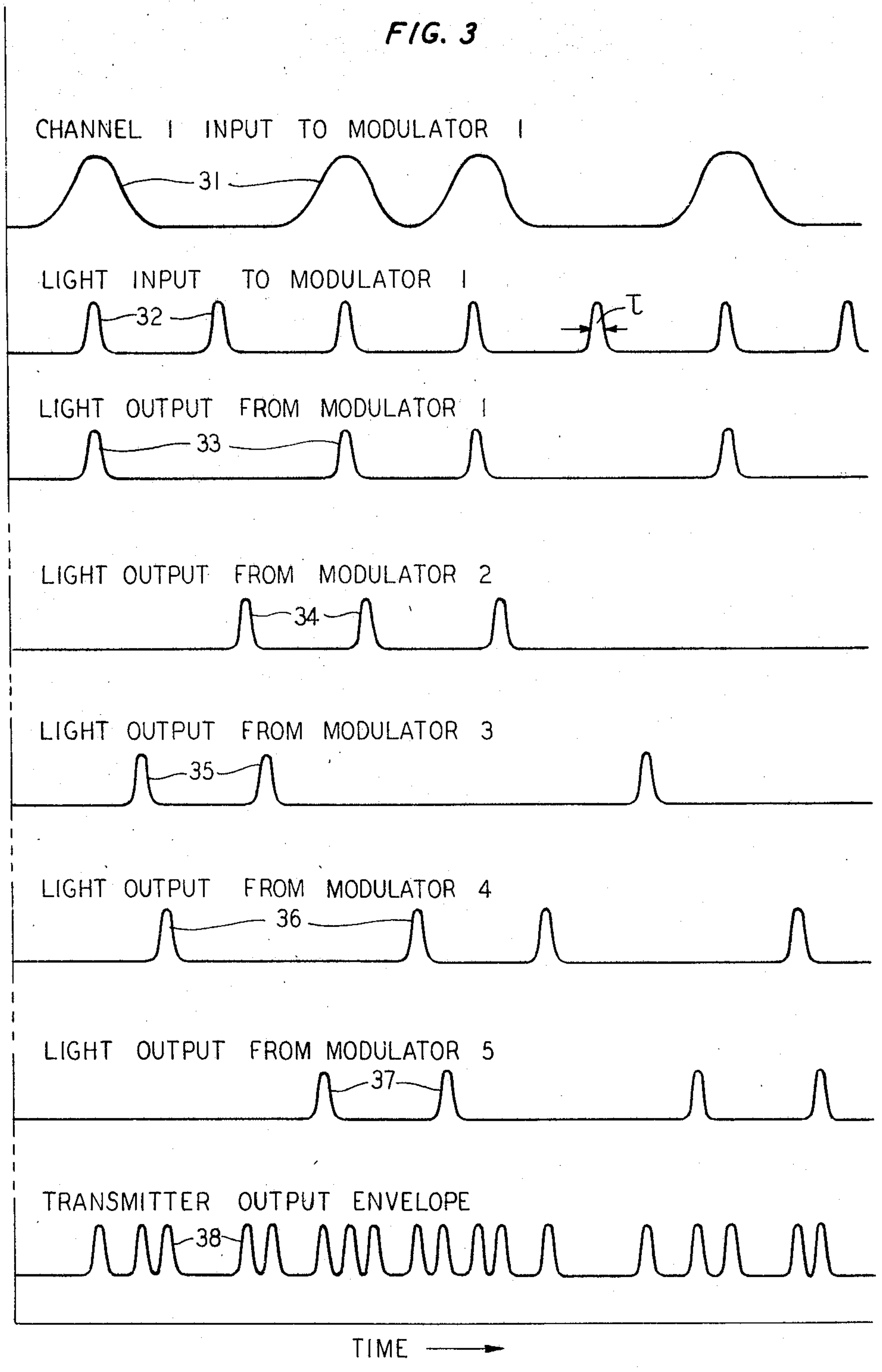
FIG. 3 shows curves useful in explaining the operation of the transmitter of FIG. 1 with pulse code modulation.

The preceding operation may be more fully understood from the diagrams of FIG. 3 in which curve 31 represents the pulse code modulated signal input for the first channel. Curve 32 represents the laser light pulses produced by deflecting the beam from laser 11 across the modulator input apertures. It is seen that, although they are substantially narrower than the input signals, they are made to occur so that there is always a light pulse to sample an input signal. The light pulses in curve 32 are only those light pulses which are applied to the first modulator 14. It is understood that for each pulse shown in curve 32 there are $(n-1)$ other light pulses produced in a deflection cycle, one for each remaining one of the $(n-1)$ modulators. A light output from the first modulator 14 will be obtained only when the pulses of curves 31 and 32 substantially coincide as illustrated in curve 33. Similar signal input and light input curves could be given for all the other modulators, but they would be substantially similar in nature to curves 31 and 32. For the purpose of illustrating the multiplexing of the light output from all of the modulators, typical light outputs from four of the other modulators are shown as curves 34 through 37, respectively. Curve 38 of FIG. 3 shows the multiplexed light pulses at the output of deflector 15. It is seen that the pulses from the different modulators all fall into an orderly, interleaved sequence, which is known as a time-division multiplex sequence.

The components of FIGS. 1 and 2 are illustratively the following. The laser 11 could be any high-power efficient, single-mode, low-noise laser driven by a suitable continuous power source to produce a continuous-wave output. Such lasers include neodymium-doped YAG lasers, helium-neon lasers, argon-ion lasers, xenon lasers and carbon dioxide lasers. In any event, the lasers 20 could be similar to laser 11, but adapted to operate as amplifiers.

The lenses 13, 16 and 23 are all spherical converging lenses of like power. The modulators 14 are illustratively of the type described in Kaminow et al., Patent No. 3,133,198, issued May 12, 1964, and would illustratively be used with analyzers at the output in order to provide the amplitude modulation, without accompanying polarization modulation, as would typically be used in a pulse code modulation system. The circular sweep generators 17 and 27 are conventional sinusoidal signal generators capable of producing pairs of output signals of like frequency and like amplitude, and 90° out of phase. In particular, the sweep generator 27 is provided with a synchronizing signal input in a manner well known in the electronics art. The detectors 24 of FIG. 2 are illustratively solid-state photodiodes such as silicon or germanium photodiodes wtih relatively fast response characteristics; but they could also be photomultipliers, avalanche photodiodes, or other optical detectors. The amplifiers 28 and 28' of FIG. 2 are electronic amplifiers of bandwidth $b$ and are conventional. The generator 29 is a low-pass filter with a pass-band approximately twice the pulse repetition rate of the clock signals.

Figure 4:
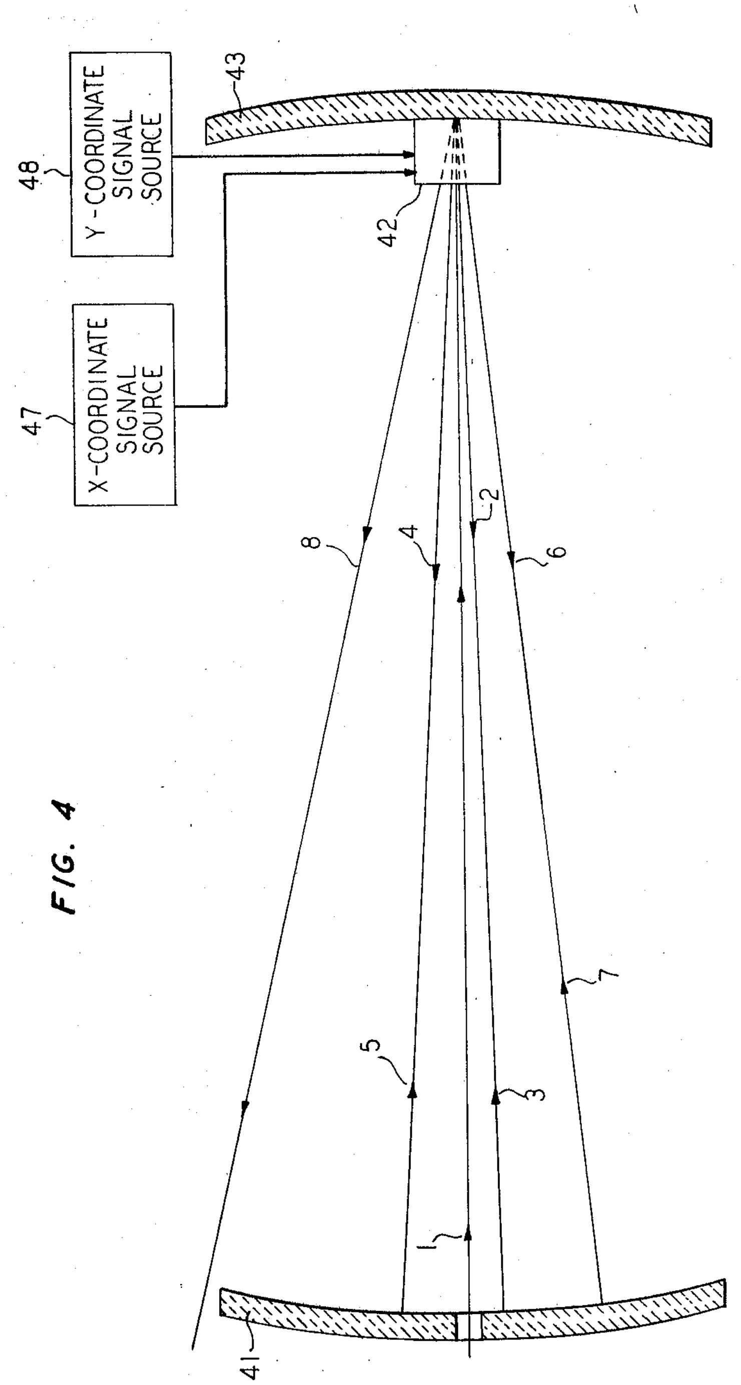
FIG. 4 is a partially pictorial and partially block diagrammatic illustration of a multiple-pass light deflector that is useful in conjunction with our invention.

The deflectors 12, 15 and 22 will now be specifically described with reference to FIG. 4. Suitable deflectors for use as shown in FIG. 4 are also disclosed and are claimed in the concurrently filed application of one of us, R. Kompfner, Ser. No. 631,394, and the concurrently filed application of E. A. Ohm, Ser. No. 631,505, both of which are assigned to the assignee hereof.

In implementing the basic idea of a conical scan of circular cross section, the deflector of FIG. 4 represents a solution to the problem that the deflection angles in most electro-optic deflectors are relatively small. Electro-optic deflection is preferred, as compared, for example, to magneto-optic deflection, because of the speed with which it can be accomplished. Its response characteristics are compatible with the multiplexing frequencies, $f_m$, that are of interest. Basically, multiplication of the small electro-optic deflections are obtained by bouncing the deflected beam a number of times off reflectors in a confocal arrangement, while varying the deflecting signals periodically at appropriate frequencies.

The operation of the deflector of FIG. 4 can be described as follows. Assume that a coherent narrow light beam, as provided by a laser such as laser 11 of FIG. 1, enters the deflector through a central aperture or uncoated portion of the mirror 41. The deflection apparatus 42 is suitably energized with X and Y-coordinate deflection signals, 90° out of phase and of equal amplitude. The beam as it strikes the reflector 43 would describe, for a single pass through apparatus 42, a circular cone of some small angle, $\theta$. It will be noted that the beam is slightly obliquely incident at the reflector 43, so that even though the electro-optic deflection has reciprocal characteristics, the beam will propagate back through the apparatus 42 at an angle on the other side of the normal to reflector 43 with respect to its direction of incidence. The beam will continue to be bent in the same direction as it was on its entry path so that together with the oblique reflection the net result of the double pass through apparatus 42 will be a total deflection through an angle $2\theta$. The light beam now propagates back to the reflector 41 along the path numbered 2 and returns to the deflection apparatus 42 along path 3 which coincides with path 2, since it is normally incident at reflector 41.

The deflection will be augmented with every two passes through the rotary deflector 42 if the time for two passes of the beam between reflectors 41 and 43 equals half a period of the deflection signal frequency $f_m$, which is also the multiplexing frequency. In principle, high multiplication factors for the deflection can be achieved; the multiplication factor depends directly upon the number of passes that the light beam is constrained to make between reflectors 41 and 43 before it is emitted as an output. The multiplication factor can be raised by increasing the lateral extent of the reflector 41.

The deflector itself is a multiple-pass deflector instead of a resonant deflector because the beam at no time repeats any part of its path between its entry into the strucure and its departure therefrom as the deflected beam.

The confocal spacing of mirrors 41 and 43 means that the center of curvature of each lies at a central point upon the surface of the other one and that the common focal point lies at a point halfway therebetween. Such a structure is capable of supporting a large number of different mode patterns. Accordingly, it will support a pattern of non-reentrant beam paths determined by the diameter, convergence and direction of the entering beam, for a given single-pass deflection. In the case in which the deflection apparatus 42 is located at the mirror 43, the beam will pass through the apparatus 42 while propagating in both directions and will tend to propagate along a radius of the mirror 41 both in propagating toward mirror 41 and returning from it.

It may be noted that, if the deflection apparatus 42 were disposed at the common focus of the mirrors 41 and 43, the deflected beam would pass through the apparatus 42 only when propagating in the general direction of its entry through the aperture of the mirror 41. It would tend to propagate parallel to the common axis of the two mirrors when propagating in the opposite direction. For that arrangement, the deflection would be multiplied only half as fast as that of the specifically illustrated embodiment of FIG. 4.

Additional advantages of the rotary deflector of FIG. 4 are that the curvature of the mirrors prevents spreading of the light beam due to diffraction, regardless of the positioning of the deflection apparatus. Further, if the beam is introduced at the aperture of mirror 41 with an extremely small waist, or diameter, it can be efficiently deflected in the apparatus 42 at mirror 43 at a somewhat larger diameter and still emerge as an output beam at mirror 41 with the same small waist that it had initially.

The deflector of FIG. 4 can be used for all of the deflectors 12, 15 and 22, although the deflector 12 can be eliminated if one is willing to employ a large number of the input lasers 11 each of which is properly pulsed. A multiple-pass deflector such as shown in FIG. 4 is preferred for the deflectors 15 and 22 in order to obtain maximum information capacity in the multiplex system; but single-pass deflectors of other types including magneto-optic and mechanical deflectors could be employed for lower capacity systems.

Figure 5:
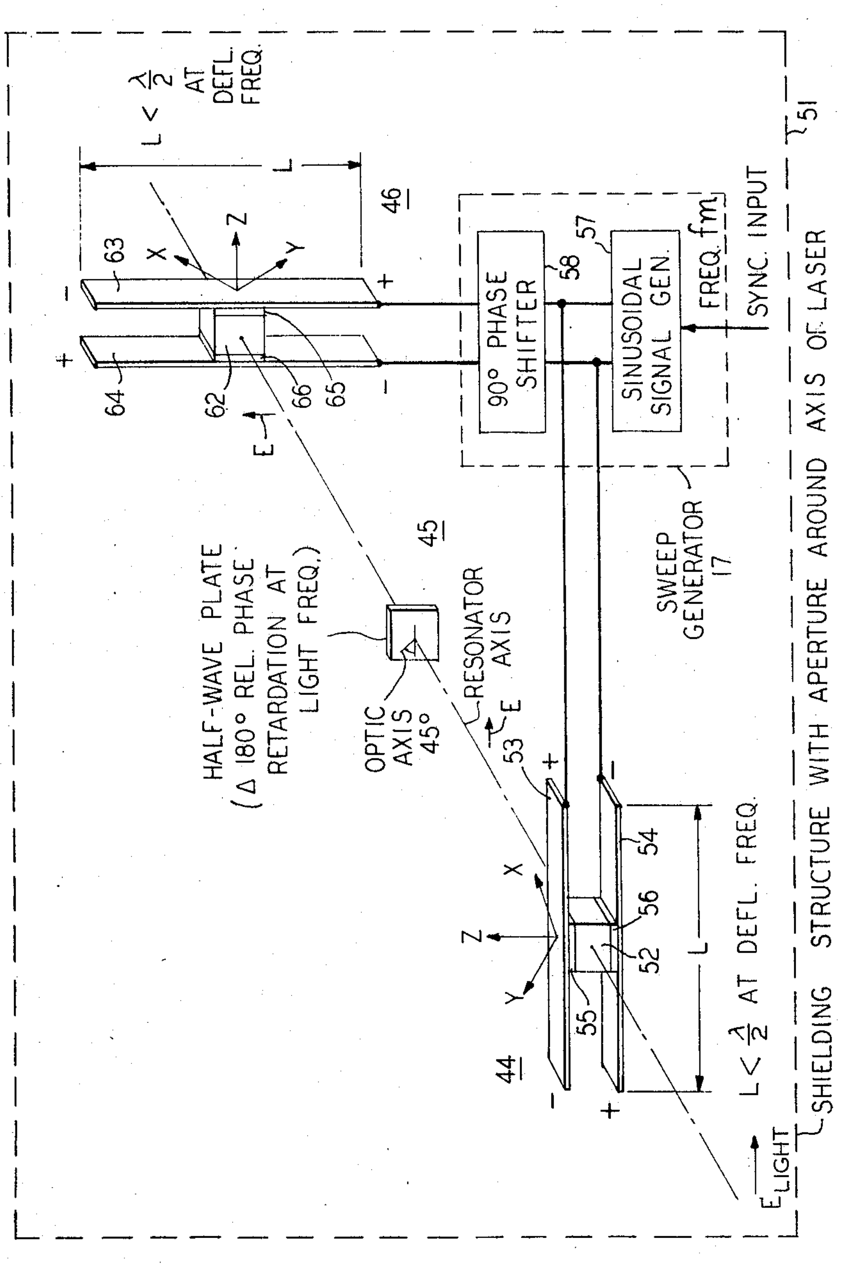
FIG. 5 is an exploded perspective view of the active components of the light deflector of FIG. 4.

A preferred construction of the apparatus 42 is shown in the exploded view of FIG. 5. It is assumed that the horizontal deflection stage 44 is farthest from the mirror 43 and that the vertical deflection stage 46 is immediately adjacent to the mirror 43. Mirror 43 is not shown in FIG. 5 in order to simplify the drawing and the explanation.

The horizontal deflection stage 44 comprises the electro-optic crystal 52, illustratively a KDP (potassium dihydrogen phosphate) crystal having its Z-crystalline axis oriented orthogonal to the plane including the common axis and the desired deflection coordinate and having its X and Y-crystalline axes both oriented at angles 45° with respect to the common axis in the plane of the common axis and the desired deflection coordinate. Crystal 52 is energized by the X-coordinate deflection signal through the symmetrically disposed strip lines 53 and 54, each of which is slightly less than a half wavelength long at the deflection frequency, $f_m$, and is oriented parallel to the direction of the desired deflection coordinate. Strip line 54 is separated from crystal 52 by the metal step 56 and the strip line 53 is separated from crystal 52 by the metal step 55. These metal steps help to shape the driving electric field distribution, which distribution will be described hereinafter. The symmetrical disposition of the strip lines 53 and 54 provide an effective ground plane halfway therebetween; the arrangement is thus a balanced arrangement. The application of power through the strip lines 53 and 54 to the crystal 52 is facilitated by the presence of the shielding structure 51 which encompasses both deflection stages except for the needed aperture for the deflected beam and the area of the reflector 42 immediately adjacent to the deflection stage 46.

Between deflection stage 44 and deflection stage 46 there is inserted a half-wave plate 45 which is illustratively a calcite crystal cut to have appropriate thickness at the desired modulating frequency and to have parallel major faces that are oriented orthogonally to the common axis of the deflector. These major faces are cut parallel to the optic axis of the crystal which is oriented at 45° with respect to both of the desired deflection coordinates as indicated. The plate 45 produces 180° relative phase retardation between polarization components respectively parallel and perpendicular to the optic axis as they pass therethrough. The vertical deflection stage 46 comprises the crystal 62, the symmetrically disposed strip lines 63 and 64, and metal steps 65 and 66, all of which are comparable to the elements of deflection stage 44 which are numbered with numbers ten digits lower. It may be seen that deflection stage 46 is effectively the same as deflection stage 44 rotated 90° in a plane orthogonal to the common axis.

Figure 6:
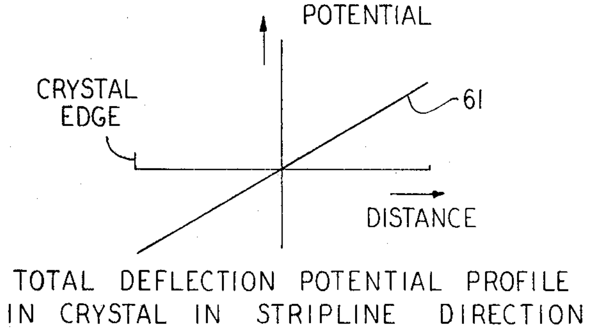
FIG. 6 shows a typical deflection potential profile in the deflection coordinate for one of the electroptic crystals of FIG. 5.

In the operation of the deflection stages of FIG. 5, the X-coordinate deflection signal is applied to the strip lines 53 and 54 so that the former has a positive-to-negative voltage gradient in one direction when the latter has a negative-to-positive voltage gradient in the same direction, both gradients having the same potential at a point midway between the ends, directly above and below the center of crystal 52, respectively. These voltage gradients are sustained on the strip lines 53 and 54 because they are near a half wavelength long, as compensated for dielectric effects, at the modulating frequency $f_m$ and behave as separate transmission lines at that frequency. Within the crystal 52, the effects of the nearly sinusoidal voltage gradients produced by strip lines 53 and 54 are additive so that the total voltage difference, or deflecting potential, across crystal 52 in a vertical direction at any X-coordinate point therein is twice as great as would be produced by one of the strip lines alone. Steeply sloping, nearly linear portions of the sinusoidal gradients occur between left and right edges of crystal 52. The profile of the voltage differences across crystal 52 varies from left to right in a substantially linear manner as shown in FIG. 6, in which the negative portion of curve 61 represents a voltage which is negative at strip line 53 and positive at strip line 54 and the positive position represents a voltage which is positive at a strip line 53 and negative at strip line 54.

It should be understood that this voltage profile for crystal 52 continuously varies its slope between that shown and an equal negative slope at the deflecting frequency $f_m$.

The light input to deflection stage 44 is assumed to be polarized in the X direction in order to obtain the maximum response to the voltage profile. The voltage profile produces a refraction effect exactly analogous to a left-to-right density gradient shaped as shown by curve 61 of FIG. 6. In more theoretical terms, the voltage profile produces a corresponding profile in the index of refraction.

The half-wave plate 45 converts the polarization of the light from an X-axis polarization to a Y-axis polarization in order to make it as responsive as possible to the index-of-refraction profile that is obtained in vertical deflection stage 46 in a manner similar to that of the horizontal deflection stage 44. The light beam will tend to be bent toward the region of the highest index of refraction of crystal 52, illustratively to the right in the drawing, and will tend to be bent toward the region of highest index of refraction in crystal 62, illustratively in the downward direction. After a slightly oblique reflection from the mirror 43, the beam will experience additional deflections in the same directions upon its reverse passage through crystals 62 and 52. During the reverse passage, the half-wave plate 45 converts the vertical polarized light emerging from crystal 62 into horizontal polarized light entering crystal 52.

In employing the deflector of FIGS. 4 and 5 in the system of FIG. 1, it is apparent that the input light beam from laser 11 will have to be reflected from one or more mirrors in order to enter the deflector 12 from the same end as the output beam leaves. One 45° angle mirror is sufficient if the laser 11 is oriented to direct its beam orthogonal to the axis of the desired deflection cone. Similarly, the output beam from deflector 15 will emerge from the same end of the deflector as the entering beam and must be redirected into the transmission medium with one or more mirrors. At the same time, it can also be amplified in laser amplifiers. Of course, it is understood that these additional reflectors and their alignment can be avoided if one disposes the deflection unit 42 at the center of the confocal multiple-pass deflector of FIG. 4 and sacrifices one-half of the deflection multiplication.

The following characteristics of the system of FIG. 1 may also be of interest to one making and using our invention. The capacity of the optical transmission system can be indicated by the following simple analysis.

Suppose the signal consists of amplitude pulse code modulation. The detectors are assumed to be photomultipliers with very large gain, quantum efficiency $\eta$ and substantially no dark current or other noise. Assume that optical energy in each pulse is such that $m/\eta$ photons are contained in it. Errors will occur when no photoelectrons are emitted even though $m/\eta$ photons have, on the average, arrived during an ON pulse. The probability of no electrons at all being emitted is then $$w_0=e^{-m} \quad (3)$$

If the probability of errors in a single channel is to be less than, say $10^{-10}$, this requires $$m>\frac{10}{0.434}=23 \text{ electrons} \quad (4)$$

The average light energy per pulse should thus exceed $$\frac{23}{\eta}\cdot hf_o \quad (5)$$

where $h$ is Planck's constant, $6.63 \times 10^{-34}$ joule seconds, and $f_o$ the light frequency. The mean light power input per channel, if there are as many ON as OFF pulses, is thus $$P_i=\frac{1}{2}\frac{23}{\eta}hf_of_m\approx\frac{12}{\eta}hf_ob \quad (6)$$

and for $n$ channels $$P_{in}\approx\frac{12n}{\eta}hf_ob\approx\frac{12}{\eta}hf_oB \quad (7)$$

Earlier we have assumed that in order to reduce cross-talk, channels have to be adequately separated in space during modulation; this will lead to a loss of light power of the order of ½. All other losses, such as reflection and scattering in the various system elements, and, most importantly, in the medium between transmitter and receiver, can be lumped together and described by a factor $\mathcal{L}$, determined from $$\mathcal{L}=\frac{\frac{1}{2}P_o}{P_{in}}=\frac{\eta P_o}{23nhf_ob} \quad (8)$$

where $P_0$ is the optical generator power. The quantity $\mathcal{L}$ is a measure of what fraction of energy can be allowed to be lost in transmission and in the device before regeneration becomes necessary.

One hundred modulators spaced around a circle implies about two hundred resolved beamwidths, which in turn implies that the rotary deflectors have to deflect a light beam with an amplitude of ±33 beamwidths, at a rate of 1,000 megahertz.

Various other devices and subsystems could be employed in connection with this optical transmission system. Some of these will now be described.

Figure 7:
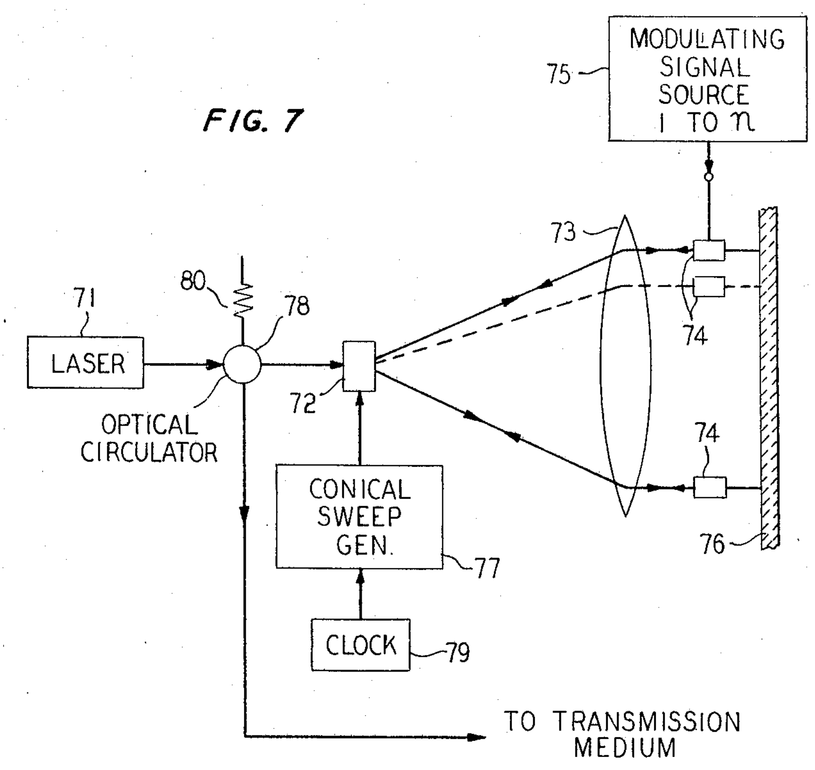
FIG. 7 is a partially pictorial and partially block diagrammatic illustration of a modification of the embodiment of FIG. 1 employing a reflective mode of operation.

The transmitter of FIG. 1 can be modified to employ a reflective mode of operation, as shown in FIG. 7.

The principal modification of the embodiment of FIG. 1 employed in the embodiment of FIG. 7 is the replacement of every component following the modulators in FIG. 1 with the planar reflector 76. In FIG. 7, all of the components are like the FIG. 1 components numbered sixty digits lower, with the except of the optical circulator 78.

The optical circulator 78 passes the coherent light beam from the laser 71 thorugh first and second ports to the deflector 72 and redirects the returning modulated multiplexed beam from its second port through a third port into the transmission medium. A balancing impedance 80, sometimes called a matched load, is typically connected to the fourth port. A suitable optical circulator is disclosed in the copending application of J. F. Dillon, Jr., Ser. No. 249,173, filed Jan. 3, 1963, and assigned to the assignee hereof.

In the operation of the modified embodiment of FIG. 7, the time period required for a reflected beam leaving deflector 72 to be modulated, to be reflected at reflector 76, to have its modulation increased on its reverse pass through its modulator 74 and to arrive at the point of deflector 72 from which it left, should be equal to an integral number of multiplexing cycles, preferably one. The deflector 72 will be at the same point in its repetitive cycle as when the beam left. The modulated beam will then be directed back into the second port of the circulator and, from there, out the third port into the transmission medium.

It may be seen that modulated and unmodulated beams are traveling through deflector 72 simultaneously in opposite directions. This mode of operation increases the efficiency of the deflector.

The modulation achieved in each of the modulators 74 will be increased by the reflective mode of operation, so long as the time delay between the oppositely-directed passes through each modulator 74 is small compared to the period of all frequencies in the modulating signal band. These frequencies are all comparable to the multiplexing frequency itself, if the bandpass characteristics of the deflector are to be used effectively. It may be seen that the time delay between the oppositely-directed passes satisfies the foregoing requirement if each modulator 74 is much closer to the mirror 76 than to the deflector 72.

Figure 8:
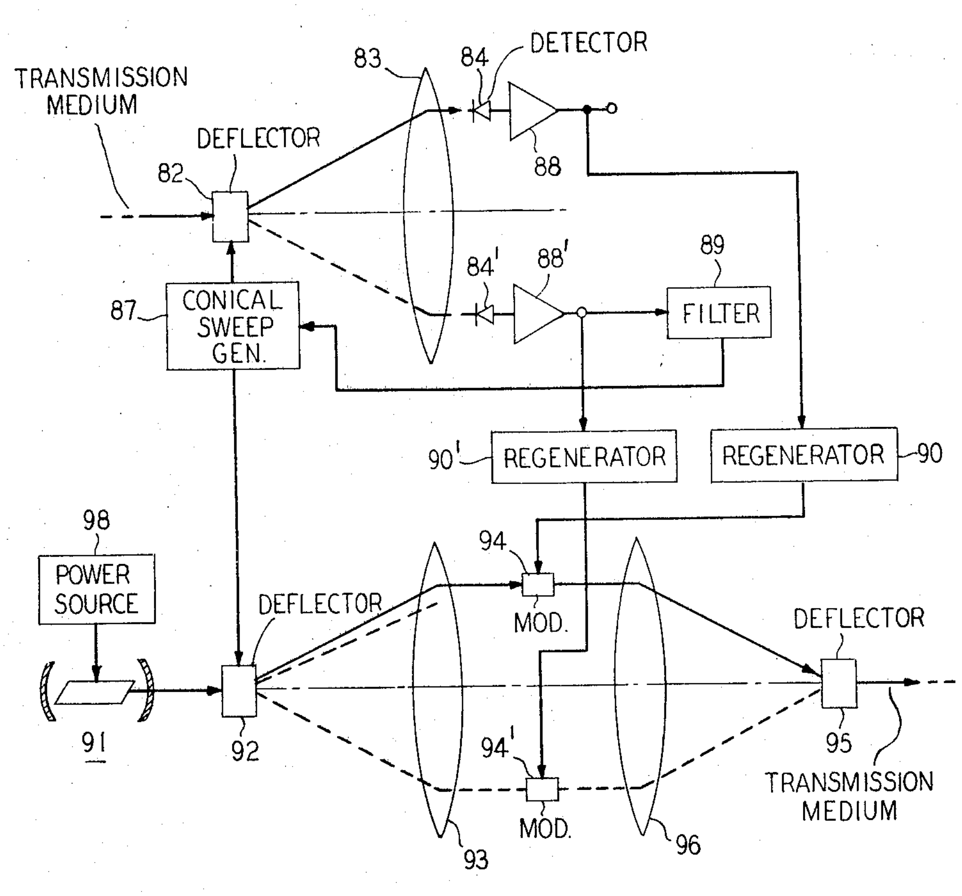
FIG. 8 is a partially pictorial and partially block diagrammatic illustration of a repeater employing our invention.

It should be noted that during transmission of the multiplexed signals between the transmitter of FIG. 1 and the receiver of FIG. 2 that regeneration, for repeating, of the signals may be needed in order to overcome the cumulative effects of loss, noise and distortion in the transmission medium. A complete repeater for such a light transmission system would consist of the cascaded combination of a receiver followed by a transmitter, with the detected and regenerated signals from the receiver applied to the modulators 94 and 94' of the transmitter, as shown in FIG. 8. The modulator 94' is in the clock signal channel.

The components of FIG. 8 are the same as the analogous components of FIGS. 1 and 2. The regenerators are conventional microwave regenerators.

The receiver of FIG. 2 may be modified for heterodyne operation by deflecting a local oscillator beam to strike the detectors in synchronism with the received beam.

Various other modifications of the disclosed embodiments should be apparent to those skilled in the communication art. For example, very large numbers of channels could be time-division multiplexed according to our invention in several groups; and then the groups could be frequency-division multiplexed. Different frequencies of input laser light would be used in each group; and the groups of beams would be directed into a common path through a dispersive prism.

The capacity of the described systems does not depend on the inherent laser transition line width; it does not depend on the ability of lasers to emit pulses. The quality of performance of the system does depend on the availability of low-noise detectors, effective modulators, which nevertheless need only a relatively narrow bandwidth, and efficient deflectors.

What is claimed is:

1. In an optical multiplex transmission system, a transmitter comprising means for supplying beams in a plurality of paths having respective optically resolvable positions for modulation, said supplying means comprising
a source of an input beam of light,
a source of a time-varying electrical signal, and
means coupled to and driven by said signal source for deflecting said beam of light sequentially into said plurality of paths in response to said signal,
a plurality of means for modulating said beams respectively disposed in said resolvable positions, and
means within said transmitter for providing inverse electrically-driven deflection of said beams into a single transmission path in a sequence synchronized with the deflection of the input beam.

2. In an optical multiplex transmission system, a transmitter comprising
a source of an input beam of light,
a source of a time-varying electrical signal,
first means coupled to and driven by said signal source for deflecting said beam to sweep repetitively around a closed path transverse to the direction of propagation of said beam and of length at least equal to a plurality of optically resolvable beam widths to supply beams in a like plurality of paths,
a like plurality of means for modulating respective ones of said beams in said plurality of paths, and
second means within said transmitter following said modulating means and responsive to said signal source for inversely deflecting said beams into a single path in a time-division sequence, said second deflecting means being synchronized with said first deflecting means, and a receiver comprising
third electrically-driven means for deflecting said beams to a plurality of optically resolvable positions for detection, and
a plurality of means respectively disposed at said plurality of resolvable positions for detecting modulation of said beams.

3. In an optical multiplex transmission system, a transmitter comprising a source of an input beam of light,
first means for deflecting said beam to sweep repetitively around a closed path transverse to the direction of propagation of said beam and of length at least equal to a plurality of optically resolvable beam widths to supply beams in a like plurality of paths,
a like plurality of means for modulating respective ones of said beams in said plurality of paths, including
means for modulating one of the beams with clock signals, and
second means within said transmitter following said modulating means for repetitively deflecting said beams into a common path in a time-division sequence, said second deflecting means being synchronized with said first deflecting means, and
a receiver comprising
third means for deflecting said beams to a plurality of optically resolvable positions for detection, and
a plurality of means respectively disposed at said plurality of resolvable positions for detecting modulation of said beams, including
means for detecting the clock signals, and
means for applying the detected signals to synchronize the third deflecting means.

References Cited

UNITED STATES PATENTS 3,256,443 6/1966 Moore -------------- 250—199
3,363,103 1/1968 Fowler et al. -------- 250—199

FOREIGN PATENTS 1,022,323 3/1966 Great Britain.

ROBERT L. GRIFFIN, Primary Examiner

A. J. MAYER, Assistant Examiner

U.S. Cl. X.R.

350—169